(12) United States Patent
Ramadasan et al.

(10) Patent No.: US 11,504,608 B2
(45) Date of Patent: Nov. 22, 2022

(54) 6DOF INSIDE-OUT TRACKING GAME CONTROLLER

(71) Applicant: Xvisio Technology Corp., Wilmington, DE (US)

(72) Inventors: Datta Ramadasan, Cournon d'Auvergne (FR); Qiong Lin, Fremont, CA (US); Hao Ye, San Jose, CA (US)

( * ) Notice: Subject to any disclaimer, the term of this patent is extended or adjusted under 35 U.S.C. 154(b) by 40 days.

(21) Appl. No.: 17/075,853

(22) Filed: Oct. 21, 2020

(65) Prior Publication Data

US 2021/0031097 A1    Feb. 4, 2021

Related U.S. Application Data

(63) Continuation of application No. 15/874,842, filed on Jan. 18, 2018, now Pat. No. 10,843,068.
(Continued)

(51) Int. Cl.
*A63F 13/213* (2014.01)
*G06T 19/00* (2011.01)
*A63F 13/211* (2014.01)

(52) U.S. Cl.
CPC .......... *A63F 13/213* (2014.09); *G06T 19/006* (2013.01); *A63F 13/211* (2014.09);
(Continued)

(58) Field of Classification Search
CPC ... B25J 9/0003; G05D 1/0246; G05D 1/0251; G06F 3/0304; G06F 3/0325;
(Continued)

(56) References Cited

U.S. PATENT DOCUMENTS 6,176,837 B1    1/2001   Foxlin ........................ 600/595
8,493,323 B2    7/2013   Griffin ........................ 345/158
(Continued)

FOREIGN PATENT DOCUMENTS

EP        3086216 A1    4/2015

OTHER PUBLICATIONS

"Hololens—Introduction to the Hololens", by Adam Tuliper, Nov. 2016. Source: https://docs.microsoft.com/en-us/archive/msdn-magazine/2016/november/hololens-introduction-to-hololens (Year: 2016).
(Continued)

*Primary Examiner* — Steven J Hylinski
(74) *Attorney, Agent, or Firm* — Helen Mao; Imperium Patent Works (57) ABSTRACT

Methods and apparatus are provided for 6DoF inside-out tracking game control. In one novel aspect, a multi-processor architecture is used for VI-SLAM. In one embodiment, the apparatus obtains overlapping image frames and sensor inputs of an apparatus, wherein the sensor inputs comprise gyrometer data, accelerometer data and magnetometer data, splits computation work onto a plurality of vector processors to obtain six degree of freedom (6DoF) outputs of the apparatus based on a splitting algorithm, and performs a localization process to generate 6DoF estimations, and a mapping process to generate a cloud of three-dimensional points associated to the descriptors of the map. In one embodiment, the localization process and mapping process are configured to run sequentially. In another embodiment, the localization process and mapping process are configured to run in parallel.

15 Claims, 6 Drawing Sheets

Related U.S. Application Data (60) Provisional application No. 62/447,867, filed on Jan. 18, 2017.

(52) U.S. Cl.
CPC .............. *A63F 2300/1006* (2013.01); *A63F 2300/8082* (2013.01)

(58) Field of Classification Search
CPC ......... G06T 19/006; G06T 7/20; G06T 7/246; G06T 7/292; A63F 13/211; A63F 13/213; A63F 13/216; A63F 2300/1006; A63F 2300/1087; A63F 2300/8082
See application file for complete search history.

(56) References Cited

U.S. PATENT DOCUMENTS

| | | | |
|---|---|---|---|
| 8,983,127 B2 | 3/2015 | Gupta et al. | 382/103 |
| 9,261,978 B2 | 2/2016 | Liberty et al. | |
| 9,384,594 B2* | 7/2016 | Maciocci | G06T 19/006 |
| 10,032,276 B1* | 7/2018 | Liu | G06V 10/464 |
| 10,043,076 B1 | 8/2018 | Zhang et al. | |
| 10,095,031 B1 | 10/2018 | Katz et al. | |
| 10,402,663 B1 | 9/2019 | Tsai et al. | |
| 10,444,021 B2 | 10/2019 | Hare | |
| 10,503,351 B2 | 12/2019 | Gullicksen | |
| 10,535,153 B2* | 1/2020 | Weising | A63F 13/211 |
| 10,620,717 B2 | 4/2020 | McCulloch et al. | |
| 2002/0060648 A1 | 5/2002 | Matsui et al. | 345/8 |
| 2003/0156144 A1 | 8/2003 | Morita | 715/848 |
| 2004/0073360 A1* | 4/2004 | Foxlin | G01C 21/16 342/357.31 |
| 2005/0182518 A1* | 8/2005 | Karlsson | G05D 1/0246 700/253 |
| 2005/0216126 A1* | 9/2005 | Koselka | B25J 5/007 700/259 |
| 2007/0156286 A1* | 7/2007 | Yamauchi | G05D 1/0278 700/245 |
| 2008/0027591 A1* | 1/2008 | Lenser | G05D 1/0297 701/28 |
| 2008/0249732 A1 | 10/2008 | Lee et al. | 702/96 |
| 2009/0005140 A1 | 1/2009 | Rose et al. | 463/ |
| 2009/0189974 A1 | 7/2009 | Deering | 348/46 |
| 2010/0110412 A1* | 5/2010 | Basu | G01C 15/002 356/3 |
| 2010/0208057 A1 | 8/2010 | Meler et al. | 348/135 |
| 2012/0194517 A1 | 8/2012 | Izadi et al. | 345/420 |
| 2012/0203453 A1 | 8/2012 | Lundquist et al. | 701/434 |
| 2012/0249741 A1 | 10/2012 | Maciocci et al. | 348/46 |
| 2012/0306850 A1* | 12/2012 | Balan | G06F 3/0304 345/419 |
| 2012/0306876 A1 | 12/2012 | Shotton et al. | 345/424 |
| 2013/0328927 A1 | 12/2013 | Mount et al. | 345/633 |
| 2014/0123507 A1 | 5/2014 | Gupta et al. | 33/1 M |
| 2015/0098614 A1* | 4/2015 | Gee | G06V 20/00 382/103 |
| 2015/0187133 A1 | 7/2015 | Martini | 345/420 |
| 2015/0237481 A1 | 8/2015 | Ben-Moshe et al. | 455/456.1 |
| 2016/0047675 A1 | 2/2016 | Tenenhaus et al. | 702/104 |
| 2016/0070265 A1* | 3/2016 | Liu | G05D 1/0088 701/25 |
| 2016/0179830 A1* | 6/2016 | Schmalstieg | G06F 16/2264 707/722 |
| 2016/0260251 A1 | 9/2016 | Stafford et al. | |
| 2016/0267720 A1 | 9/2016 | Mandella et al. | |
| 2017/0053447 A1 | 2/2017 | Chen et al. | |
| 2017/0084051 A1 | 3/2017 | Weising et al. | 382/103 |
| 2017/0124396 A1* | 5/2017 | Todeschini | G01C 15/00 |
| 2018/0096507 A1 | 4/2018 | Valdivia et al. | |
| 2019/0060708 A1 | 2/2019 | Fung | |
| 2019/0310472 A1 | 10/2019 | Schilt et al. | |

OTHER PUBLICATIONS

"Hololens—Introduction to the Hololens, Part 2: Satial Mapping", by Adap Tuliper, Jan. 2017. Source: https://docs.microsoft.com/en-us/archiver/madn-magazine/2017/january/hololens-introduction-to-thehololens-part-2-spatial-mapping (Year 2017).

"Hololens Inside-Out Tracking Is Game Changing for AR & VR, and No One Is Talking About It" by Ben Lang, Sep. 20, 2016. Source: https://www.roadtovr.com/microsoft-hololens-inside-out-tracking-augmented-reality-virual-reality-ar-vr/ (Year 2016).

"A look inside Microsoft's HoloLens holographic headset", by Dean Takahashi, Aug. 23, 2016. Source: https://venturebeat.com/2016/08/23/a-look-inside-microsofts-hololens-hololens-holographic-headset/ (Year: 2016).

"Inside Micrpsofts Hololens", by Tom Warren, Apr. 6, 2016. Source: https://www.theverge.com/2016/4/6/11376442/microsoft-hololens-holograms-parts-teardown-photos-hands-on (Year 2016).

"Microsoft HoloLens—Virtual Reality and Augmented Reality Wiki", page last modified Dec. 15, 2017, describing the product released Mar. 30, 2016. Source: https://xinreality.com/wiki/Microsoft_HoloLens (Year 2017).

"Microsoft HoloLens Development Edition Preview | PCMag", by Will Greenwald, Aug. 22, 2016. Source: https://www.pcmag.com/reviews/microsoft-hololens-development-edition (Year 2016).

"Microsoft HoloLens specs, news: Boasts six degrees of freedom", by Kristine Fernandez, Nov. 2, 2016. Source: https://www.ecumenicalnews.com/article/microsft-hololens-specs-new-boasts-six-degrees-of-freedom-and-inside-out-tracking-features-to-unveil-more-details-in-december/54252.htm (Year 2016).

"Microsoft reveals HoloLens hardware specs" by Tom Warren, Feb. 20, 2016. Source: https"//www.theverge.com/2016/2/29/11132090/Microsoft-hololens-hardware-specifications-developer-kit (Year 2016).

"Microsoft's HoloLens explained: How it works and why it's different", by Nick Statt, Jan. 24, 2015. Source: https://www.cnet.com/news/micorsoft-hololens-explained-how-it-works-and-why-its-different/ (Year: 2015).

"Microsoft's HoloLens secret sauce: A 28nm customized 24-core DSP engine built by TSMC", by Chris Williams, Aug. 22, 2016. Source: https://www.theregister.com/2016/08/22/microsoft_hololens_hpu/ (Year 2016).

"Microsoft's HoloLens uses unreleased Intel atom Chip", by Agam Shah, Jan. 22, 2015. Source: https://www.cio.com/article/2874353/microsofts-hololens-used-unreleased-intel-atom-chip.html (Year 2015).

"Project HoloLens: Our Exclusive Hands-On With Microsoft's Holographic Goggles", by Jessi Hempel, Jan. 21, 2015. Source: https://www.wired.com/2015/01/microsoft-hands-on/ (Year 2015).

"What's Inside Microsoft's HoloLens And How It Works", by Seth Colaner, Aug. 23, 2016. Source: https"//www.tomshardware.com/news/Microsoft-hololens-components-hpu-28nm.32546.html (Year: 2016).

"VR's a hog: How t get the most out of multicore CPUs for VR performance", by Matti Shaw, Feb. 11, 2016. Source: https://venturebeat.com/2016/02/11vrs-a-hog-how-to-get-the-most-of-multi-core-cpus-for-vr-performance/ (Year 2016).

\* cited by examiner

6DOF INSIDE-OUT TRACKING GAME CONTROLLER

CROSS REFERENCE TO RELATED APPLICATIONS

This application is a continuation, and claims priority under 35 U.S.C. § 120 from nonprovisional U.S. patent application Ser. No. 15/874,842, entitled "6DOF INSIDE-OUT TRACKING GAME CONTROLLER", filed on Jan. 18, 2018, the subject matter of which is incorporated herein by reference. Application Ser. No. 15/874,842, in turn, claims priority under 35 U.S.C. § 119 from U.S. Provisional Application No. 62/447,867 entitled "A MULTI AGENT STEROSCOPIC CAMERA BASED POSITION AND POSTURE TRACKING SYSTEM FOR PORTABLE DEVICE" filed on Jan. 18, 2017, the subject matter of which is incorporated herein by reference.

TECHNICAL FIELD

The present invention relates generally to VR/AR system, more particularly relates to 6DoF inside-out tracking game controller, head mount device in-side-out tracking and multi agent interaction; robot position and posture tracking, routing planning, collision avoidance.

BACKGROUND

The virtual reality (VR) and augmented reality (AR) is expected to continue to grow rapidly. With the development of new technology in both hardware and software could help the AR/VR market to grow even faster. With more applications using the technology the requirement for the system to run faster, be more accurate and without any drift for the localization.

The SLAM (simultaneous localization and mapping) algorithm is widely adopted to improve the system. However, there are three issues using the SLAM algorithm: the scale factor, the drift problem (even with a stereo camera), and the long processing time. The state of the art solutions for the drift are the on-line loop-closure and on-line re-localization (used in ORB-SLAM). Both are based on a bag of words approach (to store every patches). But the update of this bag of words is very time/CPU consuming.

Further, six degree of freedom (6DoF) data of a game controller are needed for the AR/VR system. However, the game controllers today are not efficient and fast enough to produce the 6DoF data in real time. The three dimensions for the translation in the 3D space are not obtained by the game controller of the market.

Enhancement and improvement are required tracking game controller.

SUMMARY

Methods and apparatus are provided for 6DoF inside-out tracking game control. In one novel aspect, a multi-processor structure is used for VI-SLAM. In one embodiment, the apparatus obtains overlapping image frames and sensor inputs of an apparatus, wherein the sensor inputs comprise gyrometer data, accelerometer data and magnetometer data, splits computation work onto a plurality of vector processors to obtain six degree of freedom (6DoF) outputs of the apparatus based on a splitting algorithm, and performs a localization process to generate 6DoF estimations, and a mapping process to generate a cloud of three-dimensional points associated to the descriptors of the map. In one embodiment, the splitting algorithm involves: dividing a current frame in N equal part; and each of a set of selected vector processors processes a portion of the current frame based on a split-by-corner rule, and wherein the split-by-corner rule determining whether each pixel of is a corner and classifying each pixel determined to a corner to a compressed descriptor by converting each sub-image centered by the pixel to a 16-float descriptor using a base matrix. In one embodiment, the localization process and mapping process are configured to run sequentially, wherein the localization process is split over all of the vector processors and the mapping process is split over all the vector processors. In another embodiment, the localization process and mapping process are configured to run in parallel, wherein the localization process is split over a first subset of the vector processors and the mapping process is split over the rest subset of the vector processors. In one embodiment, the 6DoF outputs is in one format selecting from an output format group comprising: six floating point values with three for the translated 3D space and three for the rotation space, twelve floating point values with three for the translated 3D space and nine for the rotation space, six fix point values with three for the translated 3D space and three for the rotation space, and twelve fix point values with three for the translated 3D space and nine for the rotation space.

In one novel aspect, a map of the background environment is generated in advance. This reference map is a batch of visual features with pre-estimated 3D position and visual feature description. The map is used for real-time localization. During the localization process, the 3D position of the features is not updated, so the map is static. Because the map is known, there is no need to map the environment constantly. And because the map is static, the localization will not drift. The potential issue of this approach is a failure of the localization when we move too far from the reference map. We solve this problem using a light SLAM algorithm.

In one embodiment, client server topology is used in deploying the mapping and localization technology, which makes the client lighter in computing and less power hungry. There could be one or more clients working on the server network. Or the client works on its own without a server at the cost of power consumption.

In another embodiment, tracking and localization are based on a known map. This allows to achieve fast processing speed. This is useful for the VR/AR application. A calibrated stereo camera is provided in this approach to fix the scale factor problem.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
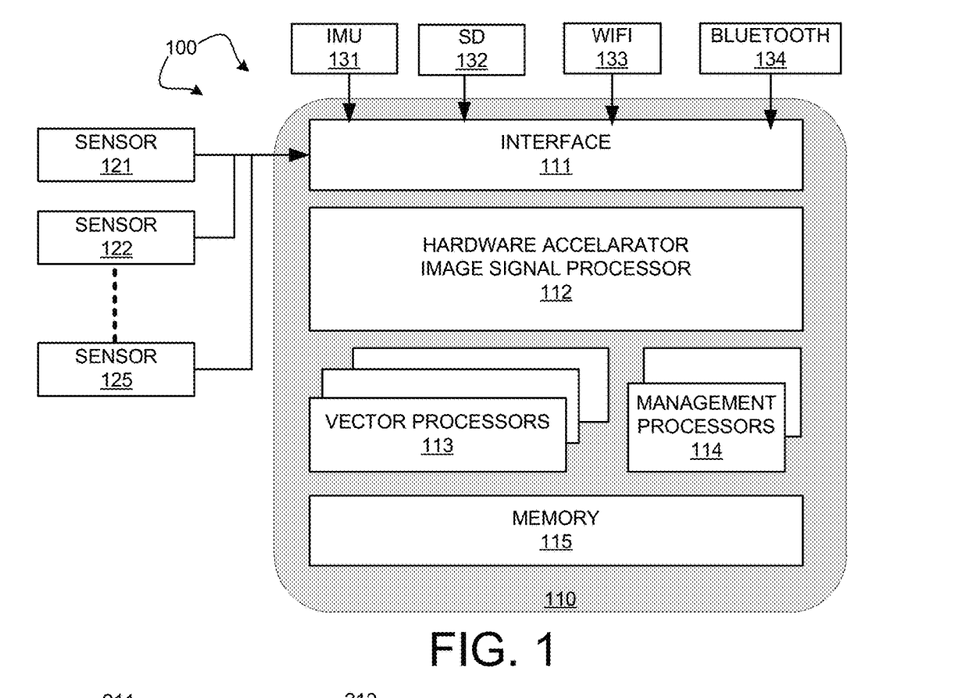
FIG. 1 illustrates an exemplary block diagram of a 6DoF inside-out tracking game controller in accordance with embodiments of the current invention.

FIG. 1 illustrates an exemplary block diagram of a 6DoF inside-out tracking game controller 100 in accordance with embodiments of the current invention. Game controller 100 is not limited to function as a game controller only. It can be an apparatus used in other scenarios and in combination with other apparatus. In one novel aspect, the 6DoF is produced in real time by game controller 100. In one embodiment, game controller 100 includes a plurality of sensors, such as sensor 121, 122, and 125. In one embodiment, the sensors are cameras. A plurality of cameras for game controller 100 generate overlapping images.

Game controller 100 also includes an inertial measurement unit (IMU) 131, an optional external memory card (SD Card) 132 Other embodiments and advantages are described in the detailed description below. This summary does not purport to define the invention. The invention is defined by the claims, and one or more wireless interface 133, such as a WiFi interface, a Bluetooth interface. An interface module 111 communicates and controls the sensors, IMU 131, SD 132, and the wireless interface, such WiFi 133 and Bluetooth 134. A hardware accelerator and image signal processing unit 112 helps image processing of the sensor inputs. IMU 131 detects of movements and rotations and magnetic heading of game controller 100. In one embodiment, IMU 131 is an integrated 9-axis sensor for the detection of movements and rotations and magnetic heading. It comprises a triaxial, low-g acceleration sensor, a triaxial angular rate sensor and a triaxial geomagnetic sensor. IMU 131 senses orientation, angular velocity, and linear acceleration of game controller 100. In one embodiment, game controller 100 processes data of an IMU frame rate of at least 500 Hz.

In one embodiment, a plurality of cameras are mounted on the outer case of the game controller to generate overlapping views for the game controller. Using multiple cameras with overlapping view has many advantages compared to monocular solution, such as the scale factor of the 3D motion does not drift, the 3D points seen on the overlapping area can be triangulated without a motion of the device, the matching on the overlapping area is faster and more accurate using the epipolar geometry, the global field of view is wider which increase the accuracy and reduce the jittering.

Figure 2:
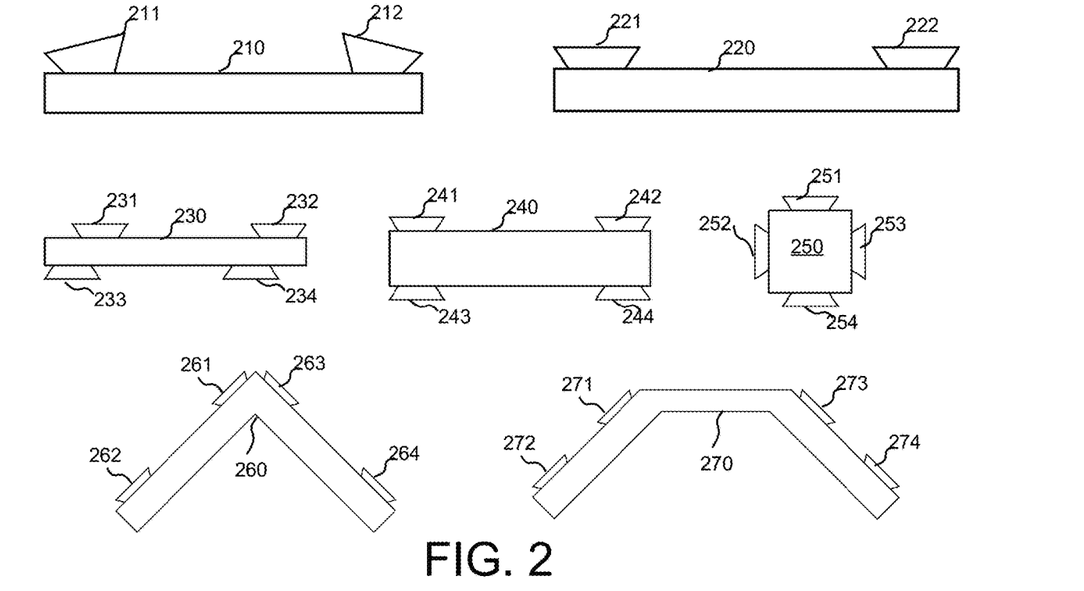
FIG. 2 illustrates exemplary multi-camera configurations in accordance with embodiments of the current invention.

FIG. 2 illustrates exemplary multi-camera configurations in accordance with embodiments of the current invention. The multi-camera configurations are not limited by the examples shown. In general, a plurality of cameras can be used to capture stereo images such that overlapping images are obtained. A game controller 210 has a straight outer case. Two cameras 211 and 211 are mounted at close to the two-ends of the outer case and the lens of the cameras are parallel with the surface of the outer case. A game controller 220 is similarly configured as game controller 210 with two cameras mounted at close to the edge of the straight line outer case. In other scenarios, four cameras are used. A game controller 230 has a straight outer case. Four cameras 231, 232, 233, and 234 are mounted at close to the edge of the outer case. The cameras that are on the same side but opposite to each other are not inline. Similarly, to game controller 230, game controller 240 also has a straight outer case with four cameras 241, 242, 243, and 244 mounted at close to the edge of the outer case. The cameras that are on the same side but opposite to each other are inline. A game controller 250 has a square outer case with four cameras 251, 252, 253, and 254. Each of the cameras is mounted on one side of the outer case. A game controller 260 is a "V" shaped outer case. Four cameras 261, 262, 263, and 264 are mounted on the outer case of game controller 260, with two of each the cameras on each leg of the outer case. In another example, a game controller 270 has an outer case in the shape of a half hexagon. Game controller 270 has four cameras with two of each mounted on the two outer legs of the outer case. Other configurations and/or different number of cameras can be configured.

Figure 3:
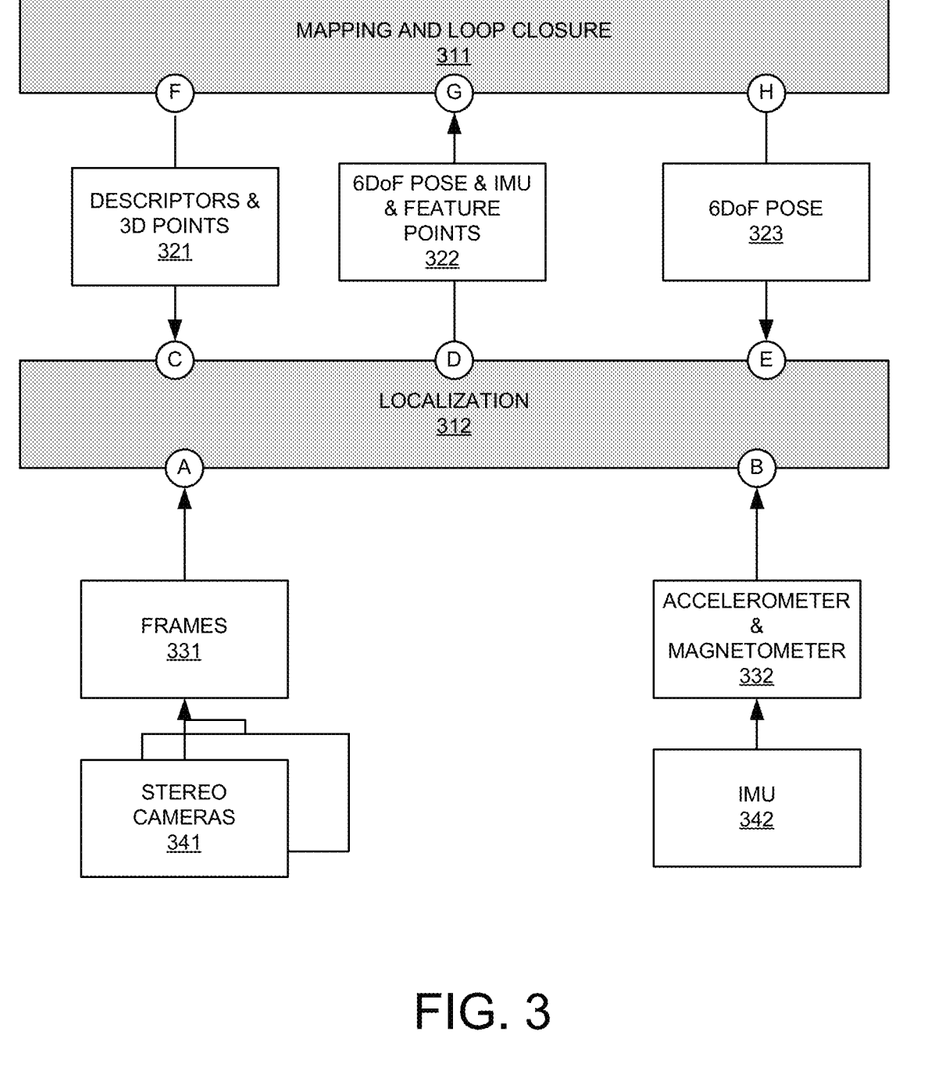
FIG. 3 illustrates an exemplary data flow for the real time stereo tracking for the game controller in accordance with embodiments of the current invention.

FIG. 3 illustrates an exemplary data flow for the real time stereo tracking for the game controller in accordance with embodiments of the current invention. Two processes are used, one localization process 312 for the real-time tracking, and one mapping process 311 for the map update. One or more stereo cameras 341 are used. The obtained images are gather in one frame 331, which through interface A is passed to the localization process 312. Similarly, IMU unit 342 talks to accelerometer, gyrometer and magnetometer 332, which through interface B is passed to localization process 312. The localization procedure generates 6DoF pose, IMU, and feature points 322 and passes through interface G of mapping and loop closure process 311. Mapping and loop closure 311 receives 6DoF pose and IMU and feature points through interface G. Mapping and loop closure 311 generates descriptors and 3D points 321 and sends it to localization 312 via its own interface F and the localization interface C. In one embodiment, mapping and loop closure 311 also generates 6DoF pose for the game controller through its interface H.

Figure 4:
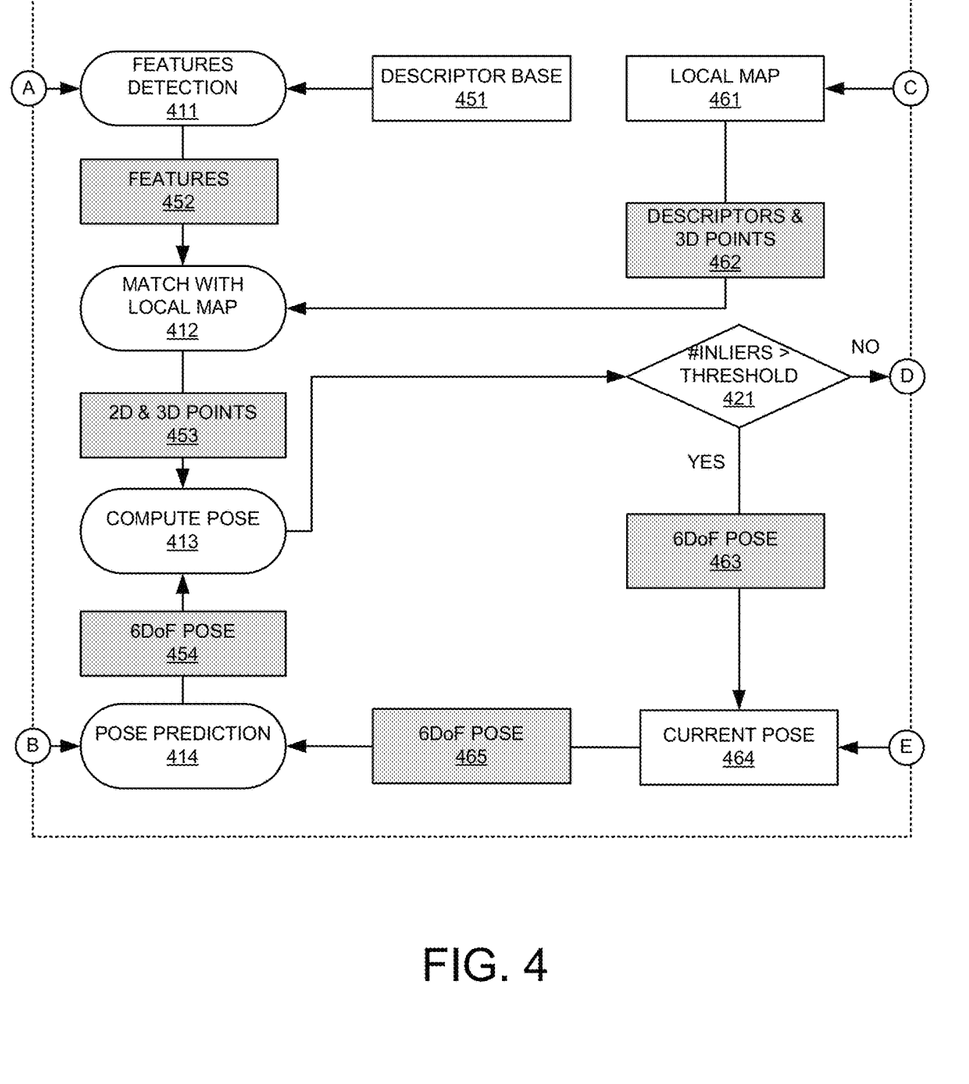
FIG. 4 illustrates an exemplary location system data flow for the real time stereo tracking for the game controller in accordance with embodiments of the current invention.

FIG. 4 illustrates an exemplary location system data flow for the real time stereo tracking for the game controller in accordance with embodiments of the current invention. The interfaces A, B, C, D, and E each corresponds to the same interfaces as marked in our FIG. 3. A feature detection procedure 411 receives stereo images from interface A and descriptors base 451. Features detection 411 detects features 452 and passes to match with local map procedure 412. Procedure 412 also receives descriptors and 3D points 462 from local map 461. Procedure 461 generates data 462 based on input from interface C, which are the outputs from the mapping procedure. Procedure 412 generates 2D and 3D points 453 of the matching result and passes to a compute pose procedure 413. The localization procedure also receives IMU inputs from interface B and passes a pose prediction procedure 414. Procedure 414 further receives 6DoF pose 465. 6DoF pose 465 is generated by current pose 464 based on inputs from interface E. Compute pose procedure 454 based on input 453 and 454 compares the result with a threshold at step 421. If step 421 determines that the number of inliers are greater than the threshold, current pose 463 is passed to current pose procedure 464. If step 421 determines that the number of inliers are not greater than the threshold, the 6DoF pose and IMU and feature points are passed to the mapping process through interface D.

In one novel aspect, the VI-SLAM algorithm is split to run on a plurality of processors based on a splitting algorithm and the sensor inputs.

Figure 5A:
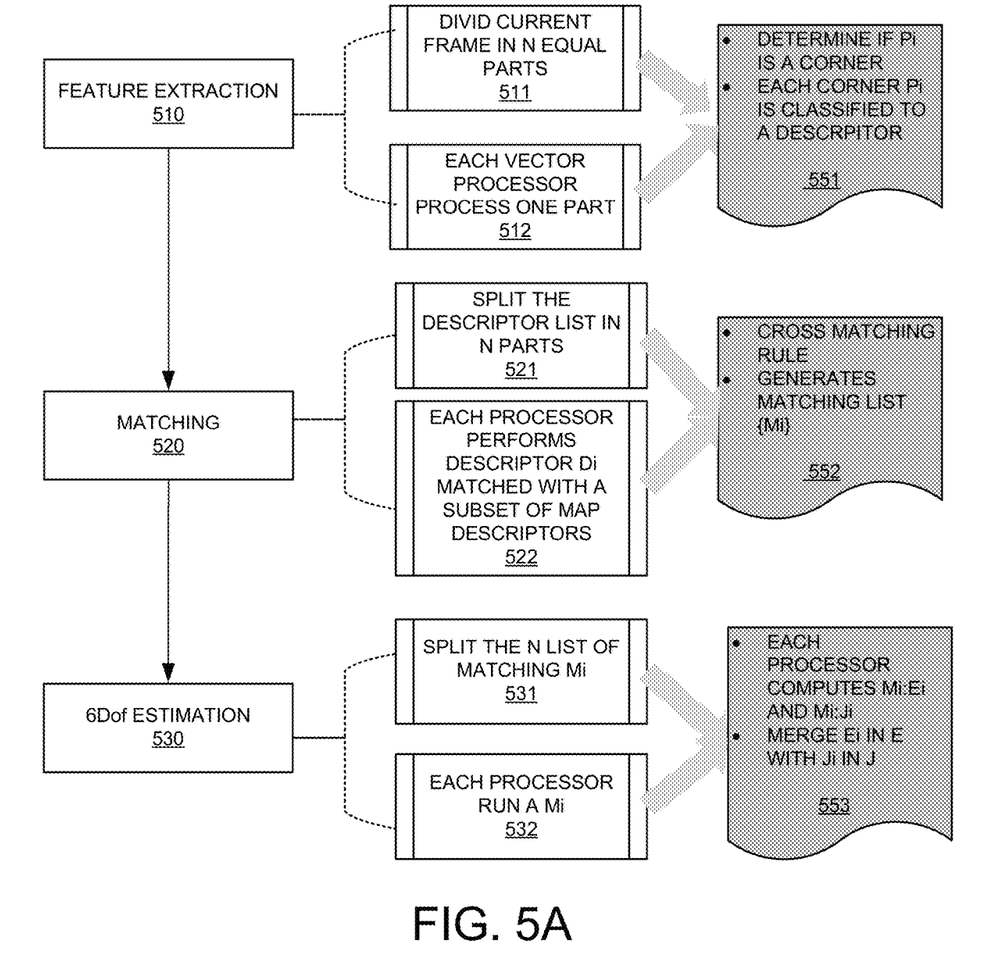
FIG. 5A illustrates exemplary flow diagram of splitting the VI-SLAM onto N vector processor for the localization process based on a splitting algorithm in accordance with embodiments of the current invention.

FIG. 5A illustrates exemplary flow diagram of splitting the VI-SLAM onto N vector processors for the localization process based on a splitting algorithm in accordance with embodiments of the current invention. In one embodiment, the localization process is a pipeline implemented as a state machine including a feature extraction procedure 510, a matching procedure 520, and a 6DoF estimation procedure 530.

In one embodiment, the feature detection and extraction procedure 510 is split to be run on N vector processors following the splitting rule. Step 511 divides the current frame to be processes into N equals part. Step 512 assign each frame part to a corresponding vector processor. Each processor processes one part of the frame following a predefine algorithm. First, a corner is determined. For each pixel $p_i$, described by a 2D coordinate in the image, and an adjustable threshold t, $p_i$ is determined to be a corner if there exist a set of K contiguous pixels in the neighbor circle, which are all brighter than $(p_i+t)$ or all darker than $(p_i-t)$. In some embodiment, threshold t is in the range of 5<t<200. In another embodiment, the K is in the range of 5<K<13. In yet another embodiment, the neighbor circle has a radius of three pixels. Subsequently, at the second step, each corner pixel $p_i$ is classified, using a n×n sub-image centered on $p_i$, to a compressed descriptor. This is done using a base matrix to convert each sub-image to a 16 floats descriptor. The base matrix is computed with a singular value decomposition on a large set of selected features. In one embodiment, the n×n sub-image is 11×11. Let $P=(p_1, \ldots, p_n)$ the list of features points (2D coordinate in the image) detected from the current frame. Let $D=(d_1, \ldots, d_n)$ the list of descriptors associated pair with each feature point with its associated descriptor.

In another embodiment, the matching procedure 520 is split onto N vector processors. Step 521 splits the descriptor list into N parts. In one embodiment, the descriptor list is equally split into N part. Step 522 performs descriptor matching for each descriptor Di by matching Di with a subset of the map descriptors. The descriptors are split in N equal range. For each vector process i, a matching algorithm applies for Di. The processor i (0<i<N+1) run the matching algorithm on the range $D_i$. The descriptors $D_i$ are matched with a subset of the descriptors of the map LocalMap (subset of the map), using the cross-matching method: each match is a a pair of descriptor $(d_a, d_b)$ such as $d_a$ is the best candidate for $d_b$ among the descriptors $D_i$ of the current frame and $d_b$ is the best candidate for $d_a$ among the descriptors of the map LocalMap. Some of the descriptors of the map are associated to some 3D points geo-referenced in world (this 3D estimation is performed by the mapping algorithm). So the matching associates each descriptor $d_i$ de D to a 3D point p3d of the LocalMap. The output of the matching is a list of descriptor pairs associating the features points P to the 3D points of the map: $M_i=((p_1,p3d_1), \ldots, (p_n,p3d_n))$.

In yet another embodiment, estimation 6DoF procedure 530 is split onto N processors. The input of this step is the N lists $M_i$ (from the matching). The 6DoF estimation minimizes, for each pair $(p_i,p3d_i)$ in M, the difference in 2D between the projected of $p3d_i$ in the current frame and $p_i$. This minimization is performed with the non-linear least square algorithm Levenberg-Marquardt combined with the M-Estimator (robust method) of Geman-McClure. The robust method of Levenberg-Marquard is used on N processors. Once split, each processor i computes the reprojection error of all the elements of Mi:Ei, computes the Jacobian error function of all elements of Mi:Ji. Subsequently, the total number of N Ei in E and the total number of N Ji in J are merged with concatenation. The median of the absolute different of E (MAD) is computed. The estimation of 6DoF is obtained by solving the linear system of $(J^TJ) X=J^TE.MAD$, where X is the update of the 6DoF.

Figure 5B:
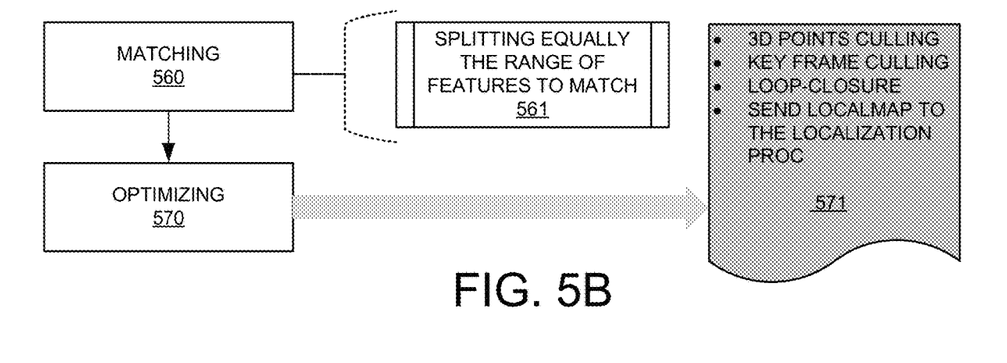
FIG. 5B illustrates exemplary flow diagram of splitting the VI-SLAM onto N vector processor for the mapping process based on a splitting algorithm in accordance with embodiments of the current invention.

FIG. 5B illustrates exemplary flow diagram of splitting the VI-SLAM onto N vector processors for the mapping process based on a splitting algorithm in accordance with embodiments of the current invention. The mapping process takes inputs of features points, descriptors and current pose and generates a cloud of 3D points associated to the descriptors. The mapping process includes a matching procedure 560 and an optimization procedure 570. Matching procedure 560 is split onto multiple processors. The features points coming from the localization are matched with a subset of features points of the map using the cross matching method. The splitting algorithm involves: splitting the range of features to match in M equal ranges. Each range is processed using a different processor. Each match performed with a descriptor which is not already associated to a 3D point of the map allows the triangulate on of a new 3D point. Optimization procedure 570 optimizes the pose and 3D points of the map to minimize the reprojection error with the Levenberg-Marquardt algorithm. The optimization may further involve: 3D point culling wherein the 3D points seen only in 2 images are removed because they are not relevant; a key frame culling that removes the key frames (poses of the map) which contain a lot of 3D points in common because they are redundant; the loop-closure procedure detects the multiple instances of the same 3D points in the map and merge them in order to save some memory and to reduce the drift of the 3D reconstruction.

In one novel aspect, using the multi-processor processors architect, the efficiencies of the localization process and the mapping process are greatly improved.

Figure 6:
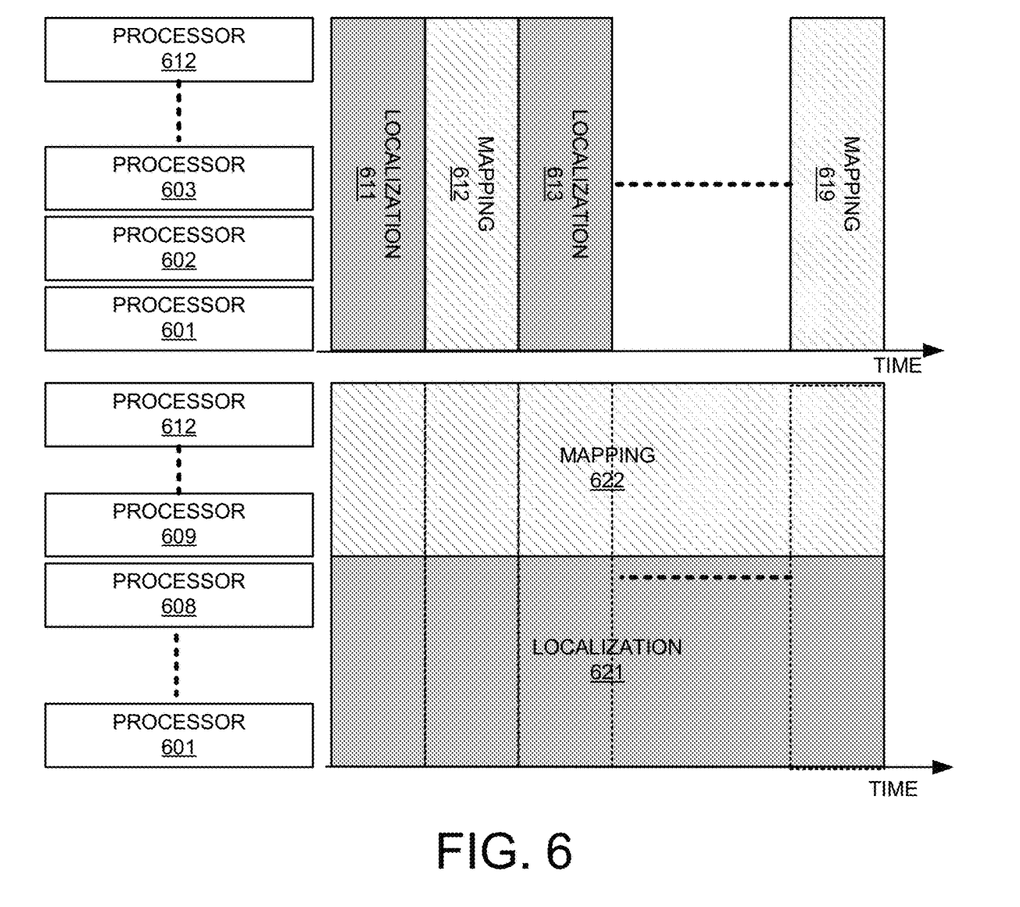
FIG. 6 illustrates an exemplary parallel and an exemplary sequential process in the multi-processor configuration in accordance with embodiments of the current invention.

FIG. 6 illustrates an exemplary parallel and an exemplary sequential process in the multi-processor configuration in accordance with embodiments of the current invention. Multiple processors, Processor 601, Processor 602, Processor 603, and Processor 612. In one embodiment, the localization process, such localization 611 and localization 612 are configured to run in serial on all the vector processors. Each localization process is split on all the vector processors. The mapping process, such as mapping process 612 and mapping process 619. The mapping process, such mapping 612 and mapping 619 are configured to run on all the vector processors. Each mapping process is split on all the vector processors. In another embodiment, the localization process and the mapping process are run in parallel. A localization process 621 is configured to occupy processor 601 to process 608 all the time. Each localization process uses a subset of the vector processors. The mapping process uses the rest of the vector processors, such as processor 609 to processor 12.

Figure 7:
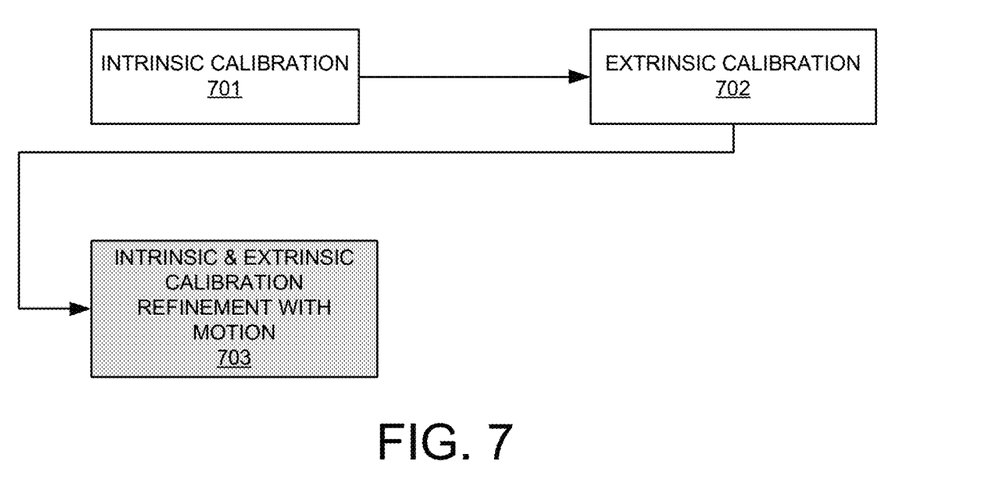
FIG. 7 illustrates exemplary diagram of a calibration process in accordance with embodiments of the current invention.

FIG. 7 illustrates exemplary diagram of a calibration process in accordance with embodiments of the current invention. The calibration is divided in three consecutive steps. Step 701 is the intrinsic calibration. The intrinsic calibration estimates the intrinsic parameters using a known pattern, such as a planar checkerboard pattern or a 3D pattern composed of multiple checkerboards with different position and orientation. The intrinsic calibration does not require overlapping area. This can be done before the cameras are mounted. Step 702 is the extrinsic calibration. The extrinsic calibration estimates of the rotation and translation between each camera; this require to have the intrinsic calibration and to see a known pattern in the overlapping area. This step must be done once all the cameras are mounted. The triangulation of the checkerboard seen at the same time with the cameras give the baseline between the cameras using. Step 703 is the intrinsic and extrinsic refinement using a motion. Moving the device on the 6DoF following a known and pre-determined motion (on all the translation and orientation axis) recording the frames. Then we use a structure from motion algorithm to estimate the motion and the 3D points frame the recorded frame. During this step, we optimize the intrinsic and extrinsic parameters to refine their values using a motion constraint based on the known and pre-determined motion: the optimization algorithm estimates the set of intrinsic and extrinsic parameters which are required to explain the known and pre-determined motion.

Figure 8:
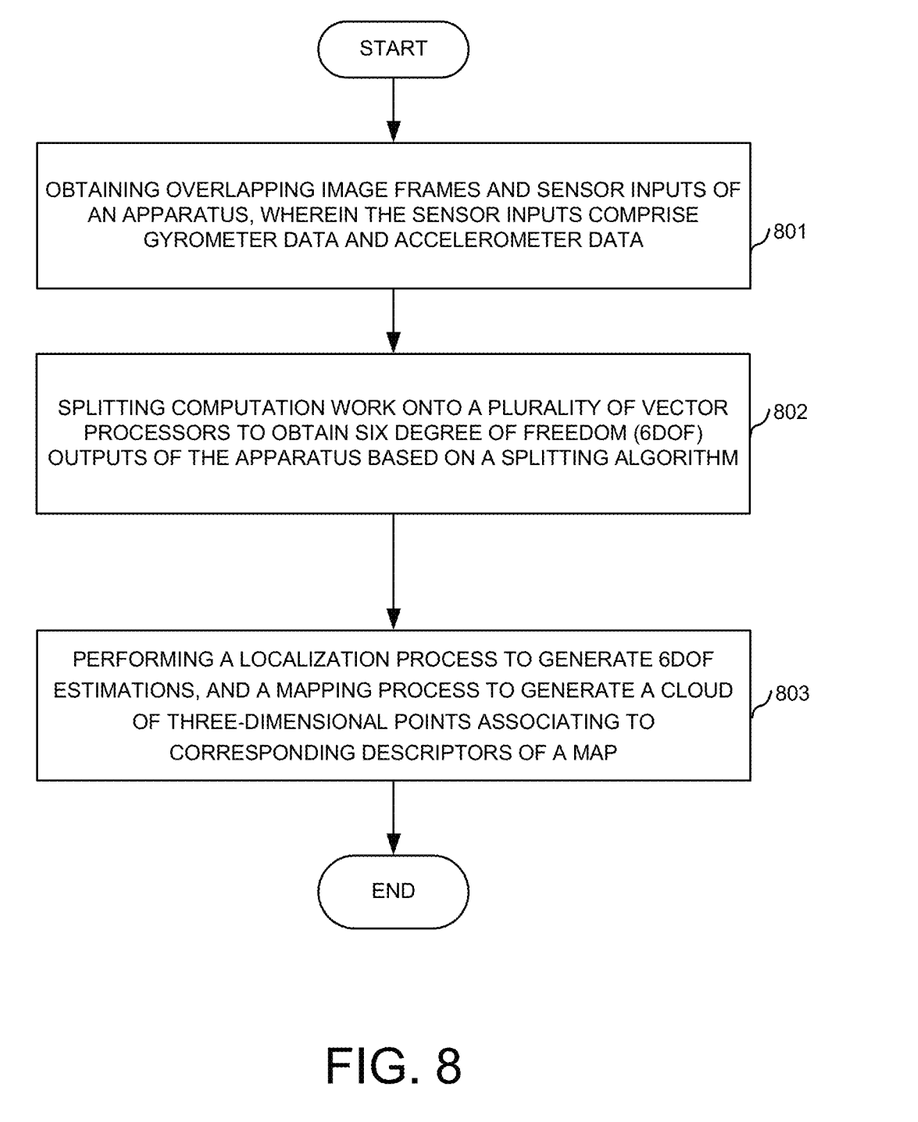
FIG. 8 illustrates an exemplary flow chart for the 6DoF inside-out tracking process in accordance with embodiments of the current invention.

FIG. 8 illustrates an exemplary flow chart for the 6DoF inside-out tracking process in accordance with embodiments of the current invention. At step 801, the apparatus obtains overlapping image frames and sensor inputs of an apparatus, wherein the sensor inputs comprise gyrometer data, accelerometer data and magnetometer data. At step 802, the apparatus splits computation work onto a plurality of vector processors to obtain six degree of freedom (6DoF) outputs of the apparatus based on a splitting algorithm. At step 803, the apparatus performs a localization process to generate 6DoF estimations, and a mapping process to generate a cloud of three-dimensional points associated to the descriptors of the map.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. An apparatus operating in portable device or robotic system comprising:
   a sensor unit that collects locale information of the apparatus;
   a map receiver that receives a static map from a remote map generating center, wherein the static map is generated based on locale information collected by the apparatus;
   a localization generator that generates localization information of the apparatus and splits computation work onto a plurality of vector processors to obtain six degree of freedom (6DoF) outputs of the apparatus based on a splitting algorithm, wherein the splitting algorithm involves: dividing a current frame in N equal part; and each of a set of selected vector processors processes a portion of the current frame based on a split-by-corner rule, and wherein the split-by-corner rule determining whether each pixel of is a corner and classifying each pixel determined to a corner to a compressed descriptor by converting each sub-image centered by the pixel to a 16-float descriptor using a base matrix; and
   a map creator that creates a map for the apparatus based on the received static map and the localization information.

2. The apparatus of claim 1, wherein the localization generator generates series of six degree of freedom (6DoF) outputs of the apparatus based on inputs of the sensor unit, wherein each 6DoF output comprising six dimensions of the apparatus including three dimensions of an orientation in the rotation space and three dimensions translated in a 3D space.

3. The apparatus of claim 1, wherein the sensor unit comprising a plurality of cameras and an inertial measurement unit (IMU), and wherein the plurality of cameras generate overlapping views, and wherein the IMU detects movements, rotations, and magnetic headings of the apparatus.

4. The apparatus of claim 1, wherein the apparatus is an inside-out portable device.

5. The apparatus of claim 4, wherein the apparatus is a handheld device.

6. The apparatus of claim 1, wherein the static map is shared among a plurality of users.

7. The apparatus of claim 6, wherein the static map is generated and updated by the remote generating center based on locale information collected from the plurality of users sharing the static map.

8. The apparatus of claim 1, wherein the localization generator comprises a plurality of vector processors, and wherein locale information are split onto the plurality of vector processors based on a splitting algorithm and the sensor inputs.

9. A method, comprising:
   collecting locale information of an apparatus;
   receiving a static map from a remote map generating center, wherein the static map is generated based on locale information collected by the apparatus;
   performing a localization process to generate localization information of the apparatus; and
   splitting computation work onto a plurality of vector processors to obtain six degree of freedom (6DoF) outputs of the apparatus based on a splitting algorithm, wherein the splitting algorithm involves: dividing a current frame in N equal part; and each of a set of selected vector processors processes a portion of the current frame based on a split-by-corner rule, and wherein the split-by-corner rule determining whether each pixel of is a corner and classifying each pixel determined to a corner to a compressed descriptor by converting each sub-image centered by the pixel to a 16-float descriptor using a base matrix; and
   performing a mapping process to create a map for the apparatus based on the received static map and the localization information.

10. The method of claim 9, wherein the localization information comprises series of six degree of freedom (6DoF) outputs of the apparatus based on inputs of the sensor unit, wherein each 6DoF output comprising six dimensions of the apparatus including three dimensions of an orientation in the rotation space and three dimensions translated in a 3D space.

11. The method of claim 9, wherein the locale information comprises video frames collected by a plurality of cameras and inertial movements detected by an inertial measurement unit (IMU), and wherein the plurality of cameras generate overlapping views, and wherein the inertial movements comprising movements, rotations, and magnetic headings of the apparatus.

12. The method of claim 9, wherein the static map is shared among a plurality of users.

13. The method of claim 12, wherein the static map is generated and updated by the remote generating center based on locale information collected from the plurality of users sharing the static map.

14. The method of claim 9, wherein the localization process and mapping process are configured to run sequentially, wherein the localization process is split over all of the vector processors and the mapping process is split over all the vector processors.

15. The method of claim 9, wherein the localization process and mapping process are configured to run in parallel, wherein the localization process is split over a first subset of the vector processors and the mapping process is split over the rest subset of the vector processors.

* * * * *